US011111393B2

(12) United States Patent
Muroi

(10) Patent No.: US 11,111,393 B2
(45) Date of Patent: Sep. 7, 2021

(54) THERMAL INSULATING COATING FILM AND THERMAL INSULATING PAINT COMPOSITION

(71) Applicant: DREAM MAKER 53 CORPORATION, Tokyo (JP)

(72) Inventor: Ichiro Muroi, Tokyo (JP)

(73) Assignee: DREAM MAKER 53 CORPORATION, Tokyo (JP)

(*) Notice: Subject to any disclaimer, the term of this patent is extended or adjusted under 35 U.S.C. 154(b) by 360 days.

(21) Appl. No.: 16/060,218

(22) PCT Filed: Dec. 8, 2016

(86) PCT No.: PCT/JP2016/086523
§ 371 (c)(1),
(2) Date: Jun. 7, 2018

(87) PCT Pub. No.: WO2017/099171
PCT Pub. Date: Jun. 15, 2017

(65) Prior Publication Data
US 2018/0362774 A1 Dec. 20, 2018

Related U.S. Application Data

(60) Provisional application No. 62/264,968, filed on Dec. 9, 2015.

(51) Int. Cl.
*C09D 5/00* (2006.01)
*C09D 7/40* (2018.01)
(Continued)

(52) U.S. Cl.
CPC ............... *C09D 5/00* (2013.01); *C09D 5/004* (2013.01); *C09D 7/40* (2018.01); *C09D 7/65* (2018.01);
(Continued)

(58) Field of Classification Search
CPC . C09D 5/00; C09D 5/32; C09D 5/304; C09D 5/02; C09D 5/18; C09D 7/70;
(Continued)

(56) References Cited

U.S. PATENT DOCUMENTS

2014/0287220 A1    9/2014  Imai et al.

FOREIGN PATENT DOCUMENTS

JP    2001-220552 A    8/2001
JP    2004-000940    *   1/2004
(Continued)

OTHER PUBLICATIONS

Translation for JP2004-940, Jan. 8, 2004.*
PCT/ISA/210, "International Search Report for International Application No. PCT/JP2016/086523," dated Feb. 7, 2017.

*Primary Examiner* — C Melissa Koslow
(74) *Attorney, Agent, or Firm* — Manabu Kanesaka

(57) ABSTRACT

To provide a thermal insulating coating film, which can achieve excellent thermal insulating performance and far-infrared ray reflection performance when formed on, for example, the surface of an outer wall or inner wall of a house and which has excellent adhesiveness and durability. The thermal insulating coating film of the present invention contains a styrene-alkyl acrylate copolymer or a butyl acrylate-styrene copolymer, a white pigment, and hollow acrylic beads. The mass ratio of styrene-alkyl acrylate copolymer or butyl acrylate-styrene copolymer and hollow acrylic beads (hollow acrylic beads/styrene-alkyl acrylate copolymer or butyl acrylate-styrene copolymer) is 1 or less.

4 Claims, 2 Drawing Sheets

(51) Int. Cl.
*C09D 125/04* (2006.01)
*C09D 133/04* (2006.01)
*C09D 7/65* (2018.01)
*C09D 125/14* (2006.01)
*E04B 1/78* (2006.01)
*C09D 5/33* (2006.01)
*C09D 125/08* (2006.01)
*C09D 133/06* (2006.01)
*E04B 1/76* (2006.01)

(52) U.S. Cl.
CPC ............. *C09D 7/70* (2018.01); *C09D 125/04* (2013.01); *C09D 125/08* (2013.01); *C09D 125/14* (2013.01); *C09D 133/04* (2013.01); *C09D 133/062* (2013.01); *E04B 1/76* (2013.01); *E04B 1/78* (2013.01); *E04B 2001/7691* (2013.01)

(58) Field of Classification Search
CPC .... C09D 7/40; C09D 7/65; E04B 1/76; E04B 2001/7691
See application file for complete search history.

(56) References Cited

FOREIGN PATENT DOCUMENTS

| | | |
|---|---|---|
| JP | 2004-000940 A | 1/2004 |
| JP | 2009-287364 A | 12/2009 |
| JP | 2014-181494 A | 9/2014 |
| JP | 2014-196401 A | 10/2014 |
| WO | 2014/192351 A1 | 12/2014 |

\* cited by examiner

THERMAL INSULATING COATING FILM AND THERMAL INSULATING PAINT COMPOSITION

RELATED APPLICATIONS

The present application is National Phase of International Application No. PCT/JP2016/086523 filed Dec. 8, 2016, and claims priority from U.S. Application Ser. No. 62/264,968, filed Dec. 9, 2015, the disclosure of which is hereby incorporated by reference herein in its entirety.

TECHNICAL FIELD

The present invention relates to a thermal insulating coating film and a thermal insulating paint composition.

BACKGROUND ART

As a thermal insulating paint composition which is applied to the surface of an outer wall or inner wall of a house to form a thermal insulating coating film, those which contain an acrylic resin as a binder and titanium dioxide and hollow beads have been conventionally known (e.g. see Patent Literature 1).

In the thermal insulating paint composition described in Patent Literature 1, an acrylic silicone resin is used as the acrylic resin and a sodium aluminosilicate glass is used as the hollow beads.

CITATION LIST

Patent Literature

Patent Literature 1: JP 2009-287364 A

SUMMARY OF INVENTION

Technical Problem

However, in a thermal insulating coating film formed from the thermal insulating paint composition described in Patent Literature 1, there are cases where sufficient thermal insulation performance cannot be obtained, and further improvement is demanded. In addition, it is preferred that a thermal insulating coating film have not only thermal insulation performance but also far-infrared ray reflection performance. Furthermore, a thermal insulating coating film is required to have adhesion strength and durability against, for example, cracks, blistering, peeling and discoloration.

In view of the above circumstances, an object of the present invention is to provide a thermal insulating coating film, which can achieve excellent thermal insulation performance and far-infrared ray reflection performance when formed on, for example, the surface of an outer wall or inner wall of a house and which has excellent adhesiveness and durability, and a thermal insulating paint composition which is used to form the thermal insulating coating film.

Solution to Problem

In order to achieve such object, the thermal insulating coating film of the present invention contains a styrene-alkyl acrylate copolymer or a butyl acrylate-styrene copolymer, a white pigment and hollow acrylic beads.

In the thermal insulating coating film of the present invention, the styrene-alkyl acrylate copolymer is a binder and has excellent weather resistance and water resistance and moreover excellent adhesion properties to a base material. In addition, a thermal insulating coating film which has excellent adhesiveness and durability against, for example, cracks, blistering, peeling and discoloration can be formed by using a styrene-alkyl acrylate copolymer. In place of the styrene-alkyl acrylate copolymer emulsion, a butyl acrylate-styrene copolymer having the same properties can be also used.

In addition, the white pigment is a material which has excellent solar reflectivity, particularly infrared ray reflectivity, and specifically titanium oxide (titanium white), zinc oxide (zinc white), lithopone, white lead, and the like are mentioned.

In addition, the hollow acrylic beads have excellent stretch properties and thus can form a coating film with a thermal insulating and moisturizing function without losing the stretch properties of styrene-alkyl acrylate copolymer.

The thermal insulating coating film of the present invention contains the rutile titanium dioxide with excellent solar reflectivity and the hollow acrylic beads with excellent thermal insulation properties as described above, and thus excellent thermal insulation properties can be obtained.

In the thermal insulating coating film of the present invention, the mass ratio of styrene-alkyl acrylate copolymer or butyl acrylate-styrene copolymer and hollow acrylic beads (hollow acrylic beads/styrene-alkyl acrylate copolymer) is preferably 1 or less.

The thermal insulating coating film is required to have adhesiveness and durability against, for example, cracks, blistering, peeling and discoloration. When the mass ratio of hollow acrylic beads is larger, adhesiveness and the above durability decrease, while when the mass ratio of styrene-alkyl acrylate copolymer or butyl acrylate-styrene copolymer is larger, adhesiveness and the above durability are improved. Thus, it is preferred that the mass of styrene-alkyl acrylate copolymer in the thermal insulating coating film be not less than the mass of hollow acrylic beads.

The thermal insulating coating film of the present invention can contain for example 45 to 85 parts by mass of hollow acrylic beads with respect to 100 parts by mass of styrene-alkyl acrylate copolymer or butyl acrylate-styrene copolymer.

When the hollow acrylic beads are contained in an amount of less than 45 parts by mass with respect to 100 parts by mass of the styrene-alkyl acrylate copolymer or butyl acrylate-styrene copolymer, there are cases where sufficient thermal insulation properties cannot be obtained. In addition, when the hollow acrylic beads are contained in an amount of above 85 parts by mass with respect to 100 parts by mass of the styrene-alkyl acrylate copolymer or butyl acrylate-styrene copolymer, the amount of styrene-alkyl acrylate copolymer or butyl acrylate-styrene copolymer relatively decreases, and thus there are cases where weather resistance to, for example, cracks, blistering, peeling and discoloration of the thermal insulating coating film is lost. Therefore, when hollow acrylic beads are contained in an amount of 45 to 85 parts by mass with respect to 100 parts by mass of styrene-alkyl acrylate copolymer or butyl acrylate-styrene copolymer, sufficient thermal insulation properties can be obtained, and a thermal insulating coating film having both sufficient adhesiveness and the above durability can be formed.

Furthermore, it is preferred that the thermal insulating coating film of the present invention contain 45 to 85 parts by mass of the hollow acrylic beads with respect to 100 parts by mass of the styrene-alkyl acrylate copolymer or butyl acrylate-styrene copolymer.

In the thermal insulating coating film of the present invention, the white pigment is preferably rutile titanium dioxide, and it is preferred that the rutile titanium dioxide be contained in an amount of 74 to 143 parts by mass with respect to 100 parts by mass of styrene-alkyl acrylate copolymer or butyl acrylate-styrene copolymer and have an average particle diameter of 0.1 to 10 µm. When the rutile titanium dioxide is contained in an amount of less than 74 parts by mass with respect to 100 parts by mass of the styrene-alkyl acrylate copolymer or butyl acrylate-styrene copolymer, there are cases where sufficient far-infrared ray reflection performance cannot be obtained. In addition, when the rutile titanium dioxide is contained in an amount of above 143 parts by mass with respect to 100 parts by mass of the styrene-alkyl acrylate copolymer or butyl acrylate-styrene copolymer, the amount of styrene-alkyl acrylate copolymer or butyl acrylate-styrene copolymer relatively decreases, and thus there are case where weather resistance, water resistance, and adhesion properties to a base material of the thermal insulating coating film are lost. When the average particle diameter of the rutile titanium dioxide is less than 0.1 µm, there are cases where sufficient far-infrared ray reflection performance cannot be obtained. When the average particle diameter is above 10 µm, there are cases where the rutile titanium dioxide is not easily dispersed in the styrene-alkyl acrylate copolymer or butyl acrylate-styrene copolymer.

In addition, in the thermal insulating coating film of the present invention, the hollow acrylic beads preferably have an average particle diameter of 0.2 to 200 µm. When the average particle diameter of the hollow acrylic beads is less than 0.2 µm, there are cases where sufficient thermal insulation properties cannot be obtained, and when the average particle diameter is above 200 µm, there are cases where the hollow acrylic beads are not easily dispersed in the styrene-alkyl acrylate copolymer or butyl acrylate-styrene copolymer.

It is also preferred that in the thermal insulating coating film of the present invention, a hydrocarbon gas be filled inside the hollow acrylic beads. The hydrocarbon gas in the hollow acrylic beads has a function of absorbing and storing electromagnetic rays in the region of far-infrared rays and emitting the stored far-infrared rays. When formed on inner walls, a thermal insulating coating film absorbs and stores far-infrared radiation heat emitted from an indoor heater, and can increase the temperature of floor, wall and ceiling by such action.

In addition, the thermal insulating coating film of the present invention preferably contains polypropylene glycol monomethyl ether. Polypropylene glycol monomethyl ether has an excellent film forming effect and moreover high water solubility and excellent compatibility with a styrene-alkyl acrylate copolymer aqueous emulsion or a butyl acrylate-styrene copolymer, and has antifreeze and freeze-thaw stabilizing effects.

Furthermore, in the thermal insulating coating film of the present invention, the hollow acrylic beads preferably occupy a volume of 60 to 80 vol % in the whole coating film. When the volume of the hollow acrylic beads in a whole thermal insulating coating film of the present invention is less than 60 vol %, there are cases where sufficient thermal insulation properties cannot be obtained, and when the volume is above 80 vol %, the amount of styrene-alkyl acrylate copolymer or butyl acrylate-styrene copolymer relatively decreases, and thus there are cases where weather resistance, water resistance and adhesion properties to a base material of the thermal insulating coating film are lost. In the thermal insulating coating film of the present invention, the volume rate of the hollow acrylic beads to the whole coating film can be calculated from the mass and specific gravity of the styrene-alkyl acrylate copolymer or butyl acrylate-styrene copolymer and the rutile titanium dioxide and the mass and apparent specific gravity of the hollow acrylic beads forming the coating film.

The thermal insulating coating film of the present invention can be formed from the thermal insulating paint composition of the present invention, containing a styrene-alkyl acrylate copolymer emulsion or a butyl acrylate-styrene copolymer, a white pigment and hollow acrylic beads.

In the thermal insulating paint composition of the present invention, the styrene-alkyl acrylate copolymer emulsion is a binder and can form a coating film which has excellent weather resistance and water resistance and moreover excellent adhesion properties to a base material. In addition, a thermal insulating coating film which has excellent adhesiveness and durability against, for example, cracks, blistering, peeling and discoloration can be formed by using a styrene-alkyl acrylate copolymer. In addition, the styrene-alkyl acrylate copolymer emulsion is an aqueous emulsion and thus has an excellent affinity with the rutile titanium dioxide, and meanwhile contains a styrene-alkyl acrylate copolymer, an acrylic resin, and thus also has an excellent affinity with the hollow acrylic beads. In addition, in place of the styrene-alkyl acrylate copolymer emulsion, a butyl acrylate-styrene copolymer having the same properties can be also used.

In the thermal insulating paint composition of the present invention, the mass ratio of the solid content of styrene-alkyl acrylate copolymer or the solid content of butyl acrylate-styrene copolymer and hollow acrylic beads (hollow acrylic beads/styrene-alkyl acrylate copolymer) is preferably 1 or less.

The thermal insulating coating film is required to have excellent adhesiveness and durability against, for example, cracks, blistering, peeling and discoloration. However, when the mass ratio of hollow acrylic beads is larger, elasticity and stretch properties decrease, while when the mass ratio of styrene-alkyl acrylate copolymer is larger, the durability is improved. It should be noted that when a coating film is formed using a styrene-alkyl acrylate copolymer with a solid content of 50 mass %, 50% moisture content is vaporized, and thus when a styrene-alkyl acrylate copolymer with a solid content of 50 mass % is used for a thermal insulating paint composition, the solid content of styrene-alkyl acrylate copolymer is half the amount thereof.

The thermal insulating paint composition of the present invention can contain for example 45 to 85 parts by mass of hollow acrylic beads with respect to 100 parts by mass of the solid content of styrene-alkyl acrylate copolymer emulsion or the solid content of butyl acrylate-styrene copolymer.

When the hollow acrylic beads are contained in an amount of less than 45 parts by mass with respect to 100 parts by mass of the solid content of the styrene-alkyl acrylate copolymer emulsion in the thermal insulating paint composition of the present invention, there are cases where sufficient thermal insulation properties cannot be obtained when a thermal insulating coating film is formed. In addition, when the hollow acrylic beads are contained in an amount of above 85 parts by mass with respect to 100 parts by mass of the solid content of the styrene-alkyl acrylate copolymer, the amount of styrene-alkyl acrylate copolymer emulsion relatively decreases, and thus there are cases where weather resistance, water resistance and adhesion properties to a base material are lost when a thermal insulating coating film is formed. Therefore, when the hollow acrylic beads are contained in an amount of 45 to 85 parts by mass with respect to 100 parts by mass of the solid content of the styrene-alkyl acrylate copolymer in the thermal insulating paint composition, sufficient thermal insulation properties can be obtained, and a thermal insulating coating film having both excellent adhesiveness and sufficient durability against, for example, cracks, blistering, peeling and discoloration can be formed.

In addition, in place of the styrene-alkyl acrylate copolymer emulsion, a butyl acrylate-styrene copolymer having the same properties can be also used.

Furthermore, the thermal insulating paint composition of the present invention preferably contains 60 to 70 parts by mass of the hollow acrylic beads with respect to 100 parts by mass of the solid content of the styrene-alkyl acrylate copolymer emulsion or the solid content or the butyl acrylate-styrene copolymer.

In the thermal insulating paint composition of the present invention, the white pigment is preferably rutile titanium dioxide, and it is preferred that the rutile titanium dioxide be contained in an amount of 74 to 143 parts by mass with respect to 100 parts by mass of the solid content of styrene-alkyl acrylate copolymer or butyl acrylate-styrene copolymer and have an average particle diameter of 0.1 to 10 μm. When the rutile titanium dioxide is contained in an amount of less than 74 parts by mass with respect to 100 parts by mass of the solid content of the styrene-alkyl acrylate copolymer emulsion or the solid content of the butyl acrylate-styrene copolymer in the thermal insulating paint composition of the present invention, there are cases where sufficient far-infrared ray reflection performance cannot be obtained when a thermal insulating coating film is formed. In addition, when the rutile titanium dioxide is contained in an amount of above 143 parts by mass with respect to 100 parts by mass of the solid content of the styrene-alkyl acrylate copolymer or the solid content of the butyl acrylate-styrene copolymer, the amount of the solid content of styrene-alkyl acrylate copolymer emulsion or the solid content of the butyl acrylate-styrene copolymer relatively decreases, and thus there are cases where weather resistance, water resistance and adhesion properties to a base material are lost when a thermal insulating coating film is formed. When the average particle diameter of the rutile titanium dioxide is less than 0.1 μm, there are cases where sufficient far-infrared ray reflection performance cannot be obtained when a thermal insulating coating film is formed. When the average particle diameter is above 10 μm, there are cases where rutile titanium dioxide is not easily dispersed in the solid content of the styrene-alkyl acrylate copolymer emulsion or the solid content of the butyl acrylate-styrene copolymer.

In addition, in the thermal insulating paint composition of the present invention, the hollow acrylic beads preferably have an average particle diameter of 0.2 to 200 μm. When the average particle diameter of the hollow acrylic beads is less than 0.2 μm, there are cases where sufficient thermal insulation properties cannot be obtained when a thermal insulating coating film is formed. When the average particle diameter is above 200 μm, there are cases where hollow acrylic beads are not easily dispersed in the solid content of the styrene-alkyl acrylate copolymer emulsion or the solid content of the butyl acrylate-styrene copolymer.

Advantageous Effects of Invention

The thermal insulating coating film or thermal insulating paint composition of the present invention can achieve excellent thermal insulation performance and far-infrared ray reflection performance when formed on, for example, the surface of an outer wall or inner wall of a house, and has excellent adhesiveness and excellent durability against, for example, cracks, blistering, peeling and discoloration.

DESCRIPTION OF EMBODIMENTS

Figure 1:
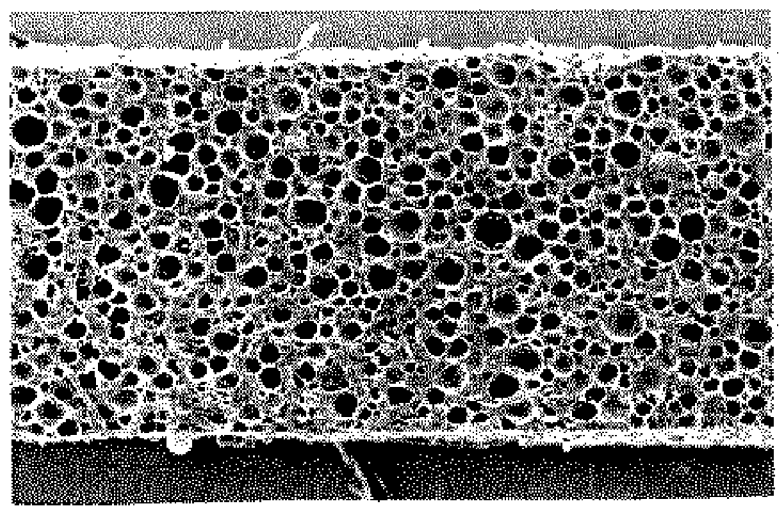
FIG. 1 is an electron micrograph of the cross-section of the thermal insulating coating film of the present invention.

The embodiments of the present invention will now be described in more detail with reference to accompanying drawings. The thermal insulating coating film of the present embodiment contains for example 74 to 143 parts by mass of rutile titanium dioxide and 34 to 64 parts by mass of hollow acrylic beads with respect to 100 parts by mass of styrene-alkyl acrylate copolymer.

The thermal insulating coating film can be formed by applying a thermal insulating paint composition, containing for example 37 to 71.5 parts by mass of rutile titanium dioxide and 17 to 32 parts by mass of hollow acrylic beads with respect to 100 parts by mass of styrene-alkyl acrylate copolymer emulsion with a solid content of 50 mass %, to a base material, for example, the surface of an outer wall or inner wall of a structure such as a house and drying the composition. At this time, in the thermal insulating coating film of the present embodiment, the hollow acrylic beads occupy a volume of 60 to 80 vol % in the whole coating film. The volume rate of the hollow acrylic beads to a whole coating film can be calculated from the mass and specific gravity of the styrene-alkyl acrylate copolymer and rutile titanium dioxide and the mass and apparent specific gravity of the hollow acrylic beads forming the thermal insulating coating film.

The styrene-alkyl acrylate copolymer emulsion is an aqueous emulsion, and Acronal (registered trademark) 295 DN ap (trade name) manufactured by BASF for example can be used, and a styrene-alkyl acrylate copolymer with a specific gravity of 1.1 is formed after drying. In addition, in place of the styrene-alkyl acrylate copolymer emulsion, a butyl acrylate-styrene copolymer having the same properties, for example Acronal (registered trademark) 296 D na (trade name) manufactured by BASF, can be also used. It should be noted that Acronal (registered trademark) 295 DN ap (trade name) manufactured by BASF is formed from a solid content of 50% and a moisture content of 50%, and a moisture content of 50% is vaporized when a coating film is formed. Therefore, when a coating film is formed using this product, 50% solid content of the styrene-alkyl acrylate copolymer emulsion will remain.

The rutile titanium dioxide preferably has an average particle diameter of 0.1 to 10 μm, and titanium dioxide for blocking infrared rays with an average particle diameter of 1.0 μm and a specific gravity of 4.2 (JR-1000 (trade name) manufactured by Tayca Corporation) for example can be used. As the rutile titanium dioxide, the titanium dioxide for blocking infrared rays and for example titanium dioxide for white pigment with an average particle diameter of 0.28 μm and a specific gravity of 4.0 (JR-603 (trade name) manufactured by Tayca Corporation) can be used in combination.

The hollow acrylic beads preferably have an average particle diameter of 0.2 to 200 μm, and for example hollow acrylic beads with an average particle diameter of 10 to 40 μm and an apparent specific gravity of 0.036 can be used. The hollow acrylic beads have a hydrocarbon gas within, and the hydrocarbon gas has a thermal conductivity of 0.01 to 0.040 W/m·K. The thermal conductivity of a gas within the hollow acrylic beads has the same degree as the thermal conductivity of dried air, and thus can achieve high thermal insulation properties. As the hydrocarbon gas within, methane, ethane, propane or butane is mentioned.

The thermal insulating paint composition of the present embodiment may further contain other additives without losing the performance of a thermal insulating coating film formed. The additives can include a plasticizer, a film forming aid, an adhesion aid, a defoamer, a dispersant, a preservative, an antifreeze, a thickening agent, a rheology modifier, 25% ammonia water, calcium carbonate, adjusting water and the like.

Examples of film forming aids include cellosolve acetate and butyl cellosolve. In addition, as a composition having a film forming auxiliary action and antifreeze action, for example, polypropylene glycol monomethyl ether (SMACK MP-70 or MP-40 manufactured by Kao Corporation) has an excellent film forming effect, and moreover a high water solubility, an excellent compatibility with a styrene-alkyl acrylate copolymer aqueous emulsion, and has antifreeze and freeze-thaw stabilizing effects.

As the first specific example of the thermal insulating paint composition of the present embodiment, one which contains 50 mass % of styrene-alkyl acrylate copolymer aqueous emulsion (Acronal (registered trademark) 295 DN ap (trade name) manufactured by BASF), 8 mass % of titanium dioxide for blocking infrared rays with an average particle diameter of 1.0 μm (JR-1000 (trade name) manufactured by Tayca Corporation), 18 mass % of titanium dioxide for white pigment with an average particle diameter of 0.28 μm (JR-603 (trade name) manufactured by Tayca Corporation), 16 mass % of hollow acrylic beads with an average particle diameter of 10 to 40 μm, in which a hydrocarbon gas is filled, 0.5 mass % of plasticizer, 3.0 mass % of film forming aid, 0.4 mass % of defoamer, 0.4 mass % of dispersant, 0.1 mass % of preservative, 3.0 mass % of antifreeze, 0.16 mass % of 25% ammonia water and 0.3 mass % of thickening agent with respect to the whole amount, and in which the remnant is adjusting water can be mentioned.

As the second specific example of the thermal insulating paint composition of the present embodiment, one which contains 44.5791 mass % of styrene-alkyl acrylate copolymer aqueous emulsion (Acronal (registered trademark) 295 DN ap (trade name) manufactured by BASF), 16.1397 mass % of tap water, 0.3972 mass % of dispersant, 4.9645 mass % of titanium dioxide for blocking infrared rays with an average particle diameter of 1.0 μm (JR-1000 (trade name) manufactured by Tayca Corporation), 10.9219 mass % of titanium dioxide for white pigment with an average particle diameter of 0.28 μm (JR-603 (trade name) manufactured by Tayca Corporation), 9.9290 mass % of calcium carbonate, 0.1986 mass % of defoamer, 4.9645 mass % of hollow acrylic beads in which a hydrocarbon gas is filled, 0.5957 mass % of adhesion aid, 0.0304 mass % of water soluble cellulose ether as a thickening agent, 0.0496 mass % of preservative, 2.9787 mass % of 2,2,4-trimethyl-1,3-pentanediol monoisobutyrate as a film forming aid or a plasticizer, 0.0811 mass % of nonionic urethane as a rheology modifier, 0.1986 mass % of 25% ammonia water, and 3.9716 mass % of propylene glycol as an antifreeze to the whole amount can be also mentioned.

In any embodiment, in place of a styrene-alkyl acrylate copolymer aqueous emulsion (Acronal (registered trademark) 295 DN ap (trade name) manufactured by BASF), a butyl acrylate-styrene copolymer having the same properties, for example Acronal (registered trademark) 296 D na (trade name) manufactured by BASF can be also used.

Next, an electron micrograph of the cross-section of a thermal insulating coating film with a thickness of 200 μm, which is formed by applying the thermal insulating paint composition on a base material and drying the composition, is shown in FIG. 1. FIG. 1 reveals that in the thermal insulating coating film of the present embodiment, a hollow beads layer is formed in which a plurality of the hollow acrylic beads is laminated with each other in the thickness direction in the inner part of the coating film.

According to the thermal insulating coating film of the present embodiment, incident infrared rays from the outside are reflected by titanium dioxide contained in the coating film and absorbed by the hollow acrylic beads. Infrared rays absorbed by the hollow acrylic beads are gradually attenuated by successively repeating emission and absorption from one hollow acrylic bead to another hollow acrylic bead laminated in the thickness direction of the thermal insulating coating film in the hollow beads layer.

As a result, the thermal insulating coating film of the present embodiment can achieve excellent thermal insulation properties. Particularly in summer, by blocking infrared rays from the outside of a structure such as a house, the effect of cooling the inside of the structure can be obtained.

In addition, in the thermal insulating coating film of the present embodiment, the hollow acrylic beads have a function of storing absorbed infrared rays in the inside thereof and emitting or radiating the stored infrared rays to the outside. Thus, particularly in winter, by absorbing and storing infrared rays radiated from e.g. a heater put in the inside of a structure such as a house and radiating the infrared rays to the inside of the structure again, the effect of warming the inside of the structure better than the performance of e.g. the heater can be obtained.

Furthermore, a thermal insulating coating film which can achieve sufficient thermal insulation properties and which has both excellent adhesiveness and sufficient durability against, for example, cracks, blistering, peeling and discoloration can be formed.

Examples of the present invention will now be described.

EXAMPLES

Example 1

In this example, first, to 100 parts by mass of styrene-alkyl acrylate copolymer aqueous emulsion (Acronal (registered trademark) 295 DN ap (trade name) manufactured by BASF), 16 parts by mass of titanium dioxide for blocking infrared rays with an average particle diameter of 1.0 μm (JR-1000 (trade name) manufactured by Tayca Corporation), 36 parts by mass of titanium dioxide for white pigment with an average particle diameter of 0.28 μm (JR-603 (trade name) manufactured by Tayca Corporation), 32 parts by mass of hollow acrylic beads with an average particle diameter of 10 to 40 μm, in which a hydrocarbon gas is filled, 1 part by mass of plasticizer, 6 parts by mass of film forming aid, 0.8 parts by mass of defoamer, 0.8 parts by mass of dispersant, 0.2 parts by mass of preservative, 6.0 parts by mass of antifreeze, 0.32 parts by mass of 25% ammonia water, 0.6 parts by mass of thickening agent, and 0.28 to 0.4 parts by mass of adjusting water were added and the obtained mixture was mixed to prepare a thermal insulating paint composition.

It should be noted that the average particle diameter of hollow acrylic beads or titanium dioxide for blocking infrared rays is measured by dynamic light scattering.

Next, the thermal insulating paint composition obtained in the present example was applied to the surface of a 128 mm×106 mm×0.3 mm color steel sheet in an amount of 0.03 g/cm² and dried to form a thermal insulating coating film with a thickness of 0.2 mm. Next, the color steel sheet on which the thermal insulating coating film had been formed was used as a sample and the thermal insulation properties of the thermal insulating coating film were evaluated using an evaluation device shown in FIG. 2.

Figure 2:
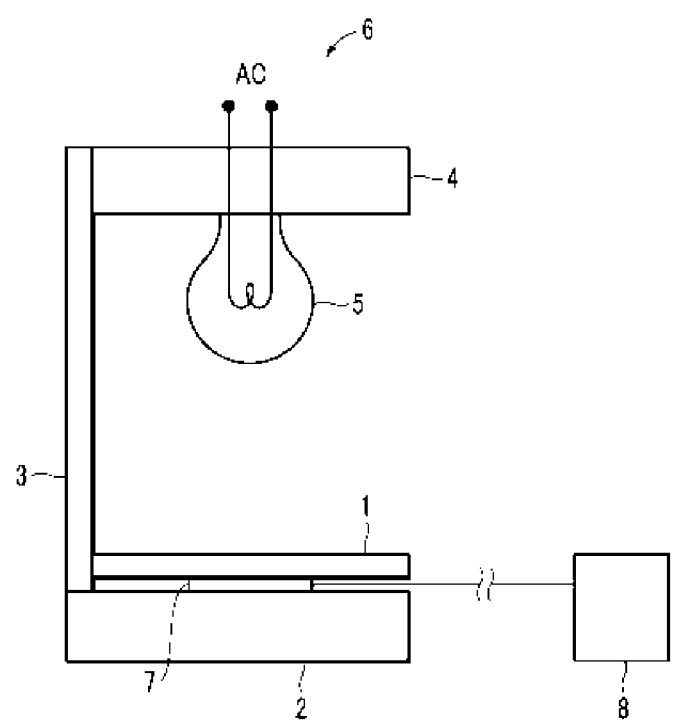
FIG. 2 is an illustration diagram which shows the structure of a device for evaluating thermal insulation properties of the thermal insulating coating film of the present invention.

The evaluation device shown in FIG. 2 has a base 2 to place a sample 1, a pillar member 3 stood on the base 2, an arm member 4 extended from the top edge of the pillar member 3 to the upper region of the base 2, and an indoor ref lamp 5 suspended from the arm member 4. The indoor ref lamp 5 is 100 W and is connected to a commercial AC power 6.

In addition, a sample 1 is put on the base 2 so that the surface on which the thermal insulating coating film has been formed will face the indoor ref lamp 5. A temperature sensor 7 is pasted on the back of the sample 1 (the surface opposite to the surface on which the thermal insulating coating film has been formed), and the temperature sensor 7 is connected to a temperature measuring device (Temperature Logger LR5021 (trade name) manufactured by HIOKI E.E. CORPORATION) 8.

Figure 3:
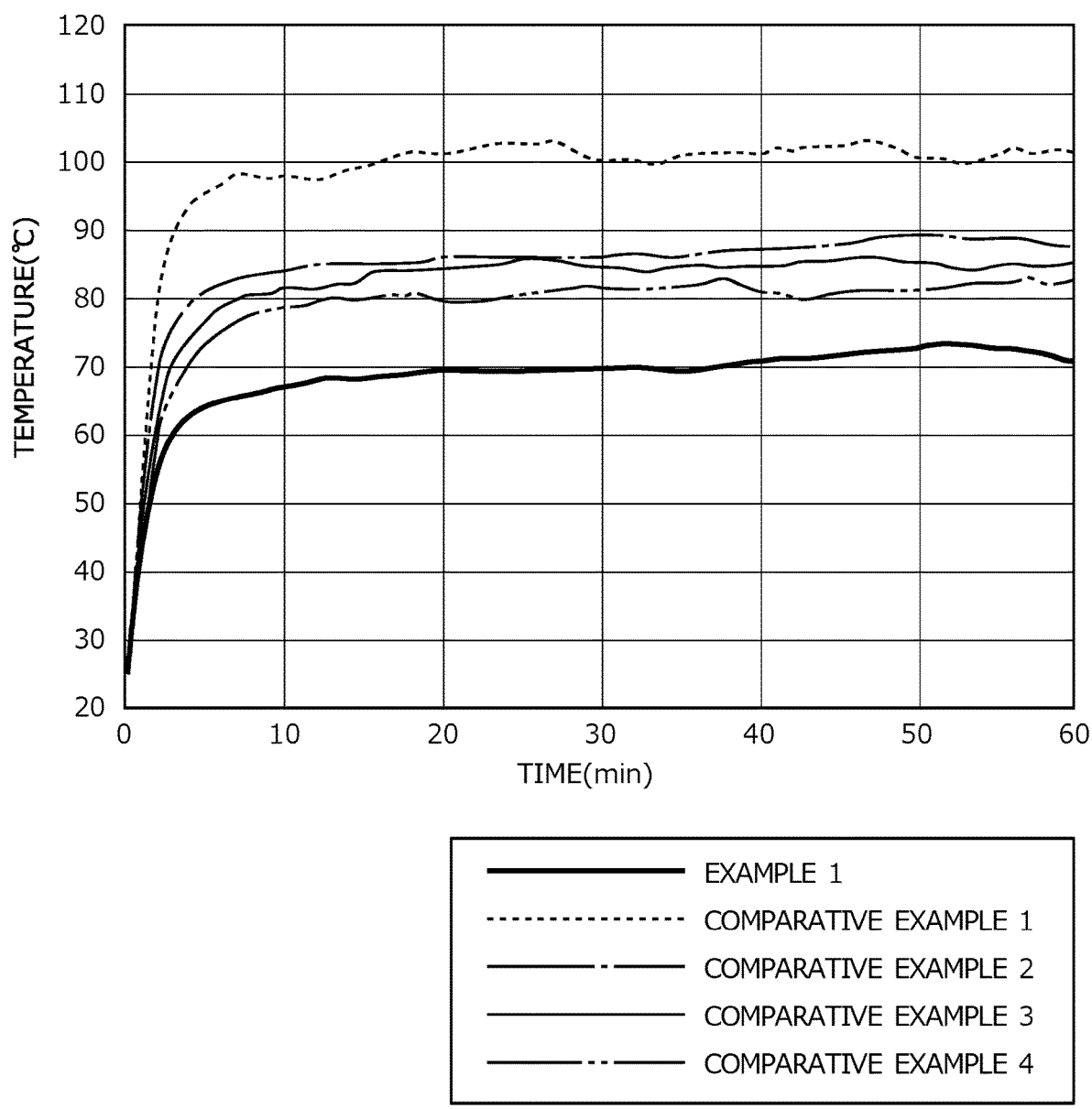
FIG. 3 is a graph which shows thermal insulation properties of the thermal insulating coating film of the present invention and other thermal insulating coating films.

In the present example, a distance between the sample 1 on which the thermal insulating coating film had been formed and the lower end surface of the indoor ref lamp 5 was set to 46 to 47 mm, a light was given to the sample 1 from the indoor ref lamp 5, and changes in temperature on the back of the sample 1 were continuously measured by the temperature measuring device 8. The results are shown in FIG. 3.

Comparative Example 1

In the present comparative example, changes in temperature on the back of a sample 1 were continuously measured by the temperature measuring device 8 in the same manner as in Example 1 except that the same color steel sheet as in Example 1 to which a thermal insulating paint composition had not been applied at all was used as the sample 1. The results are shown in FIG. 3.

Comparative Example 2

In the present comparative example, changes in temperature on the back of a sample 1 were continuously measured by the temperature measuring device 8 in the same manner as in Example 1 except that using a thermal insulation paint (trade name: COOL THERM, which mainly includes fattening compound urethane resin emulsion, acrylic resin, and specific ceramic) sold by Daiko Shokai Co., Ltd. in place of the thermal insulating paint composition used in Example 1, the thermal insulation paint was applied to the surface of the same color steel sheet as in Example 1 in an amount of 0.05 g/cm² and dried to form a thermal insulating coating film with a thickness of 0.1 mm. The results are shown in FIG. 3.

Comparative Example 3

In the present comparative example, changes in temperature on the back of a sample 1 were continuously measured by the temperature measuring device 8 in the same manner as in Example 1 except that using a thermal insulation paint (trade name: PLANET SUPRA, which mainly includes a special pigment reflecting sun light, and hollow particles) manufactured by Sci-Paint Japan, Inc. in place of the thermal insulating paint composition used in Example 1, the thermal insulation paint was applied to the surface of the same color steel sheet as in Example 1 in an amount of 0.03 g/cm² and dried to form a thermal insulating coating film with a thickness of 0.2 mm. The results are shown in FIG. 3.

Comparative Example 4

In the present comparative example, changes in temperature on the back of a sample 1 were continuously measured by the temperature measuring device 8 in the same manner as in Example 1 except that using a thermal insulation paint (trade name: GAINA, which mainly includes specific ceramic beads, and acrylic silicon resin) manufactured by NISSHIN SANGYO CO., LTD in place of a thermal insulating paint composition used in Example 1, the thermal insulation paint was applied to the surface of the same color steel sheet as in Example 1 in an amount of 0.04 g/cm² and dried to form a thermal insulating coating film with a thickness of 0.4 mm. The results are shown in FIG. 3.

FIG. 3 reveals that in the sample 1 in Example 1 having the thermal insulating coating film of the present embodiment, the temperature of the back 60 minutes after the onset of irradiation from the indoor ref lamp 5 is lower by 30° C. or more than that of the sample 1 in Comparative Example 1 which does not have a thermal insulating coating film at all, and lower by 10° C. or more than that of samples 1 in Comparative Examples 2 to 4 which have other thermal insulating coating films, and the thermal insulating coating film of the present embodiment has excellent thermal insulation properties.

Furthermore, the thermal insulating paint composition obtained in the present example was tested in accordance with "Testing methods for paints-Part 7: Long-period performance of film-Section 7: Accelerated weathering and exposure to artificial radiation (Exposure to filtered xenon-arc radiation)" in JIS K 5600-7-7:2008 on the following test conditions for a total of 4000 hours, and the existence of cracks, blistering, peeling and discoloration was evaluated.

Test Conditions
Spectral distribution: method 1
Irradiance: 60 W/m² (300 to 400 nm)
Black panel temperature: 63±3° C.
Lubrication cycle test: cycle A Consequently, cracks, blistering, peeling and discoloration all were not observed in the obtained test results.

Furthermore, the adhesion strength of the thermal insulating paint composition obtained in the present example was measured in accordance with the sample body creation for the test of only one surface in 9 Procedure 2) in Testing methods for paints—Part 5: Mechanical property of film—Section 7: Adhesion test (Pull-off method) in JIS K 5600-5-7: 2014 using a test cylinder: 20 mm in diameter, and the following results were obtained.

TABLE 1

| | |
|---|---|
| n1 | Adhesion strength: 2.2 MPa |
| | Broken state: 100% A/B |
| n2 | Adhesion strength: 1.5 MPa |
| | Broken state: 60% A, 40% A/B |
| n3 | Adhesion strength: 2.0 MPa |
| | Broken state: 60% A, 40% A/B |
| Average value | Adhesion strength: 1.9 MPa | n1 adhesion strength: 2.2 MPa
Broken state: 100% A/B
n2 adhesion strength: 1.5 MPa
Broken state: 60% A, 40% A/B
n3 adhesion strength: 2.0 MPa
Broken state: 60% A, 40% A/B
Average value adhesion strength: 1.9 MPa It should be noted that the written contents of failure state are as follows.

A: cohesive failure of a base
A/B: bond failure between a basic material and a coating film In the present example, components were blended so that hollow acrylic beads would be contained in an amount of 64 parts by mass with respect to 100 parts by mass of styrene-alkyl acrylate copolymer. In order to form a thermal insulating coating film which can achieve thermal insulation performance and far-infrared ray reflection performance and which has excellent adhesiveness and durability against, for example, cracks, blistering, peeling and discoloration, it is preferred that hollow acrylic beads be contained in an amount of 45 to 85 parts by mass with respect to 100 parts by mass of styrene-alkyl acrylate copolymer. Similarly, it is more preferred that hollow acrylic beads be contained in an amount of 55 to 75 parts by mass with respect to 100 parts by mass of styrene-alkyl acrylate copolymer. Similarly, it is further preferred that hollow acrylic beads be contained in an amount of 60 to 70 parts by mass with respect to 100 parts by mass of styrene-alkyl acrylate copolymer.

In place of a styrene-alkyl acrylate copolymer aqueous emulsion (Acronal (registered trademark) 295 DN ap (trade name) manufactured by BASF), a butyl acrylate-styrene copolymer having the same properties, for example Acronal (registered trademark) 296 D na (trade name) manufactured by BASF can be also used.

REFERENCE SIGNS LIST

1 Sample
2 Base
3 Pillar member
4 arm member
5 Indoor ref lamp
6 AC power
7 Temperature sensor
8 Temperature measuring device

The invention claimed is:

1. A thermal insulating coating film, comprising
a styrene-alkyl acrylate copolymer or a butyl acrylate-styrene copolymer,
polypropylene glycol monomethyl ether,
a white pigment, and
hollow acrylic beads,
wherein the hollow acrylic beads occupy 60-80 vol % in a whole coating film, and have an average particle diameter of 10 to 40 µm, and
the white pigment is rutile titanium dioxide, the rutile titanium dioxide is contained in an amount of 74 to 143 parts by mass with respect to 100 parts by mass of the styrene-alkyl acrylate copolymer or the butyl acrylate-styrene copolymer, and the rutile titanium dioxide has an average particle diameter of 0.1 to 10 µm.

2. The thermal insulating coating film according to claim 1, wherein a hydrocarbon gas is filled inside the hollow acrylic beads.

3. A thermal insulating paint composition, comprising
a styrene-alkyl acrylate copolymer emulsion or a butyl acrylate-styrene copolymer,
polypropylene glycol monomethyl ether,
a white pigment, and
hollow acrylic beads,
wherein the hollow acrylic beads include 17 to 32 parts by mass with respect to 100 parts by mass of the styrene-alkyl acrylate copolymer emulsion with a solid content of 50 mass % or the butyl acrylate-styrene copolymer with a solid content of 50 mass %, and have an average particle diameter of 10 to 40 µm, and
the white pigment is rutile titanium dioxide, the rutile titanium dioxide is contained in an amount of 74 to 143 parts by mass with respect to 100 parts by mass of the styrene-alkyl acrylate copolymer or the butyl acrylate-styrene copolymer, and the rutile titanium dioxide has an average particle diameter of 0.1 to 10 µm.

4. The thermal insulating paint composition according to claim 3, wherein a hydrocarbon gas is filled inside the hollow acrylic beads.

* * * * *